June 16, 1931.  R. F. CLUNY  1,810,553
OUTLET BOX FIXTURE SUPPORT
Filed July 27, 1925
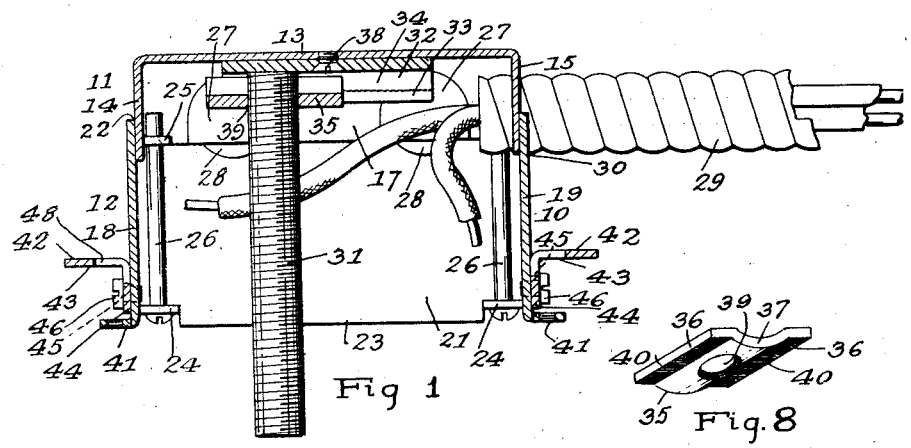
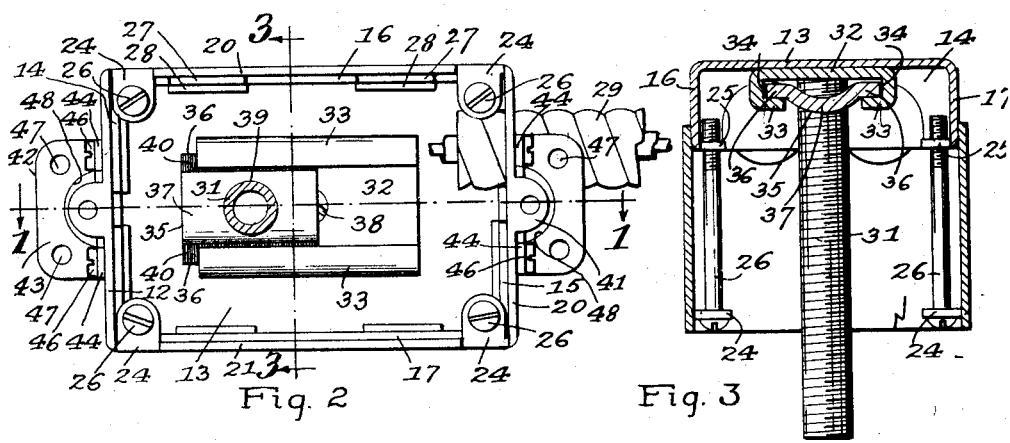
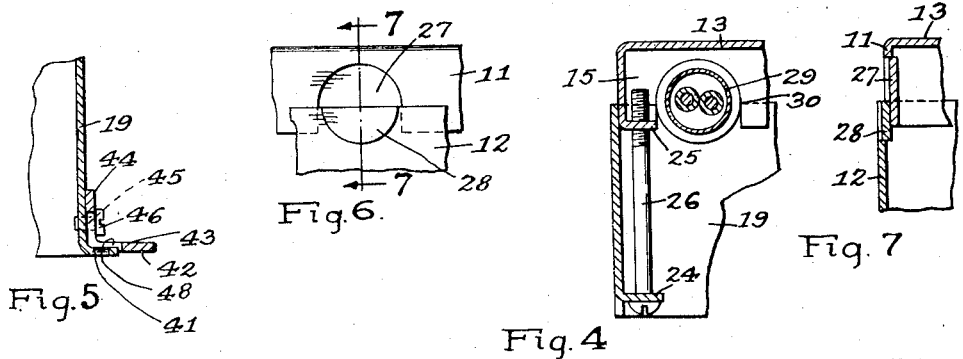
INVENTOR.
Russell F. Cluny
BY
G. H. Braddock
ATTORNEY Patented June 16, 1931

1,810,553

UNITED STATES PATENT OFFICE

RUSSELL F. CLUNY, OF STRATFORD, CONNECTICUT

OUTLET BOX FIXTURE SUPPORT

Application filed July 27, 1925. Serial No. 46,320.

This invention relates to a combination outlet and switch box, and an object of the invention is to provide a box adapted to the purpose of serving either as an outlet box or as a switch box.

A further object is to provide a device of the present character which will be an improvement generally over all more or less similar devices heretofore known.

More specific objects are to provide in the box useful and improved means adapted to grip and securely hold BX cable, or other outlet or switch box lead wires; useful and improved means for securing a fixture attaching member to the box when it is to serve as an outlet box; and useful and improved means adapted to the purpose of allowing the box to be secured in a structure so that its open end is flush with the surface of said structure, as when the box is installed in a plastered wall or ceiling, or so that said open end projects a preferred distance beyond said wall or ceiling, as when the box is installed before plastering is accomplished.

A still further object of the invention is to provide a box that will allow the fixture support to be moved toward either end of the box to give ample room to pull wire and make connections and then finally adjust and lock in the desired set position.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

In the accompanying drawings forming a part of this specification,

Fig. 1 is a longitudinal sectional view of the box of the invention, on line 1—1 in Fig. 2;

Fig. 2 is a plan view thereof, showing the fixture attaching screw in section;

Fig. 3 is a transverse sectional view, on line 3—3 in Fig. 2;

Fig. 4 is a sectional view detailing the manner in which the sections of the box are adjustably connected to grip and securely fasten the BX cable disclosed, or other outlet or switch lead wires;

Fig. 5 is a sectional view detailing the attachment bracket associated with the box in a manner different from that disclosed in Figs. 1 and 2;

Fig. 6 is a fragmentary elevational view detailing the knock-outs of the box sections;

Fig. 7 is a sectional view on line 7—7 in Fig. 6; and

Fig. 8 is a perspective view of the fixture supporting member for the fixture attaching screw.

With respect to the drawings and the numerals of reference indicated thereon, 10 represents, generally, the frame of the box, which consists of two sections 11 and 12 adjustably secured to each other.

The section 11 consists of a base 13, constituting the closed end of the box, and opposite side walls 14, 15, and 16, 17, integral with the base. Preferably, all of the side walls 14, 15, 16 and 17 are perpendicular to the base, and opposite side walls are parallel to provide a box section rectangular in horizontal cross-section, although the box could be some other shape.

The section 12 consists of opposite and parallel side walls 18, 19, and 20, 21, and is open at both ends, the inner end 22 desirably slidably, closely and snugly fitting upon the open end of the base section 11 and the outer end 23 providing the open end of the box.

Numeral 24 represents ears integral with certain of the side walls of the section 12, and 25 denotes similar ears integral with certain of the side walls of the base section 11, all of said ears being within the box. 26 are screws passing through openings in the ears 24 and threaded into openings in the ears 25. Clearly these ears are for the purpose of adjustably securing the sections 11 and 12 to each other, with side walls of the section 11 at greater or less distance within the walls of the section 12 as disclosed.

Numeral 27 indicates knock-outs in certain of the walls of the base section 11, and 28 indicates somewhat similar knock-outs in certain walls of the open section 12. As shown more clearly in Figs. 6 and 7, these knock-outs are directly opposite each other; and, as disclosed, they are of general U-shape, to always fit each other, as best shown in Fig. 7, when the sections are adjusted, within limits, toward or from each other, and thus not interfere with the adjustment of said sections. The knock-outs are similar to well known knock-outs of commerce, except that the present knock-outs are complemental, as will become apparent. They are adapted to always keep the side walls of the box positively closed. While I have preferred to show them as offset inwardly of the box, they could be offset outwardly, or need, in fact, not be offset at all.

Numeral 29 indicates a BX cable, or other outlet or switch box lead wires. It is shown inserted through a circular opening 30 from which the knock-outs 27 and 28 have been removed, and with sections 11 and 12 adjusted so that there is no opening about the cable and through the side walls of the box. See Fig. 4. Clearly, loosening the screws 26 allows for enlargement of the opening 30 for insertion of a cable or other lead wires, and tightening of the screws causes inserted cable or other lead wires to be gripped and securely held in the box. See Figs. 1 and 4.

Numeral 31 represents a fixture attaching screw. The one disclosed is an ordinary article of commerce and can be bought in convenient lengths. When manufacturing my device, I may prefer to not supply therewith the screw 31, but I will incorporate devices in the box with which said attaching screw can be conveniently and readily associated to be securely held. Of these devices, 32 indicates generally a retaining guideway and is a channel piece, or desirably flat portion of metal having inwardly extending flanges 33 providing opposite guides or ways 34 for a fixture supporting member 35. This fixture supporting member is best disclosed in Figs. 1, 2, 3, and 8. Its opposite side edges 36 are slidably arranged in the ways 34, while its central portion 37 is desirably bowed in a direction away from the base 13. The channel piece or flat portion of 32 is of sufficient length to preclude removal of the member from the channel piece when once inserted in the box, as will be understood, and said channel piece, is, as disclosed, secured to the base 13 by the screw 38 (see Figs. 1 and 2), although it could be otherwise secured. The central portion 37 of the member 35 has a threaded opening 39 to receive a fixture attaching screw 31.

To fasten a screw 31 to the box, all that is necessary is to insert said screw into said threaded opening 39. When the screw shall have been inserted to the depth forcing the opposite side edges 36 to come into engagement with the inner faces of the flanges 33 (see Fig. 3), the screw will be locked in the channel piece, 40 representing roughened surfaces which the retainer preferably has to better grip said flanges 33. It will be clear that the arrangement as disclosed provides for an adjustment between a fixture and the box, this existing by reason of the fact that the fixture supporting member is slidable in the channel piece before it is locked therein by the fixture attaching screw.

Outwardly extending ears 41, arranged centrally of the end walls at the open end of the box, are of ordinary design.

Brackets 42 are adapted to allow the box to be incorporated in a structure so that its open end is flush with the surface of said structure, as when the box is installed in a plastered wall or ceiling, or so that said open end projects a preferred distance beyond said wall or ceiling, as when the box is installed before the structure is plastered. The construction of these brackets will be clear from Figs. 1, 2 and 5. Each bracket consists of a body portion 43 having spaced arms 44 perpendicular to the body portion. Each arm 44 has an opening 45 to receive a screw 46 adapted to enter a side wall of the box, and the body portion 43 has spaced openings 47 to receive attaching means (not shown) adapted to enter a structure to receive the box. When the arms 44 are secured to the box, as in Figs. 1 and 2, so that the portions 43 are opposite the open end of the box, securing said portions 43 against a surface will, naturally, provide a protruding open end. When the arms 44 are secured to the box, as in Fig. 5, so that the portions 44 are approximately flush with the open end of the box, securing said portions 43 against a surface will bring the open end of the box approximately flush with said surface. The portion 43 of each bracket is cut away, as at 48, to clear each ear 41 when the bracket is attached in the manner just described. See Fig. 5.

The outlet and switch box of the present invention has been designed with present day practices of electricians in mind. The box provides ample space for the splices when a fixture is secured against the open end of the box, as by a knob or the like (not shown) upon the outer end of the attaching screw 31 and engaging the fixture. And, when used either as a switch box or an outlet box, the construction described provides a box which can nicely meet all of the conditions and requirements of present day use to which the device can be put.

Having thus fully described the invention, what I claim as new and desire to secure by Letters Patent is:

1. The combination with an outlet box, a channel shaped guide member supported on a wall of the box, a movable nut member within the channel, means on the flanges of the channel preventing movement of the nut member except longitudinally of the channel, and a fixture attachment threaded through the nut member into contact with the web of the channel.

2. The combination with an outlet box, a guideway on the box, a supporting member carried thereby and movable only longitudinally in the guideway, and a fixture supporting nipple carried by the supporting member and movable therethrough at an angle to the direction of movement of said member to contact with a stationary part of the assembly.

3. The combination with an outlet box, a guideway on the box, a nut member carried by the guideway, cooperating means on the guideway and nut member to prevent movement of said member except longitudinally of the guideway, and a fixture attaching nipple threaded through the nut member to contact with a stationary part of the assembly upon rotation of the nipple.

4. The combination with an outlet box, a supporting member carried thereby and longitudinally movable in said box, and a fixture supporting nipple carried by said member and movable therethrough at an angle to the direction of movement of the member to contact with the box to secure said fixture in the desired adjusted position.

Signed at Bridgeport, in the county of Fairfield and State of Connecticut, this 25th day of July, A. D., 1925.

RUSSELL F. CLUNY.